Figure 1:
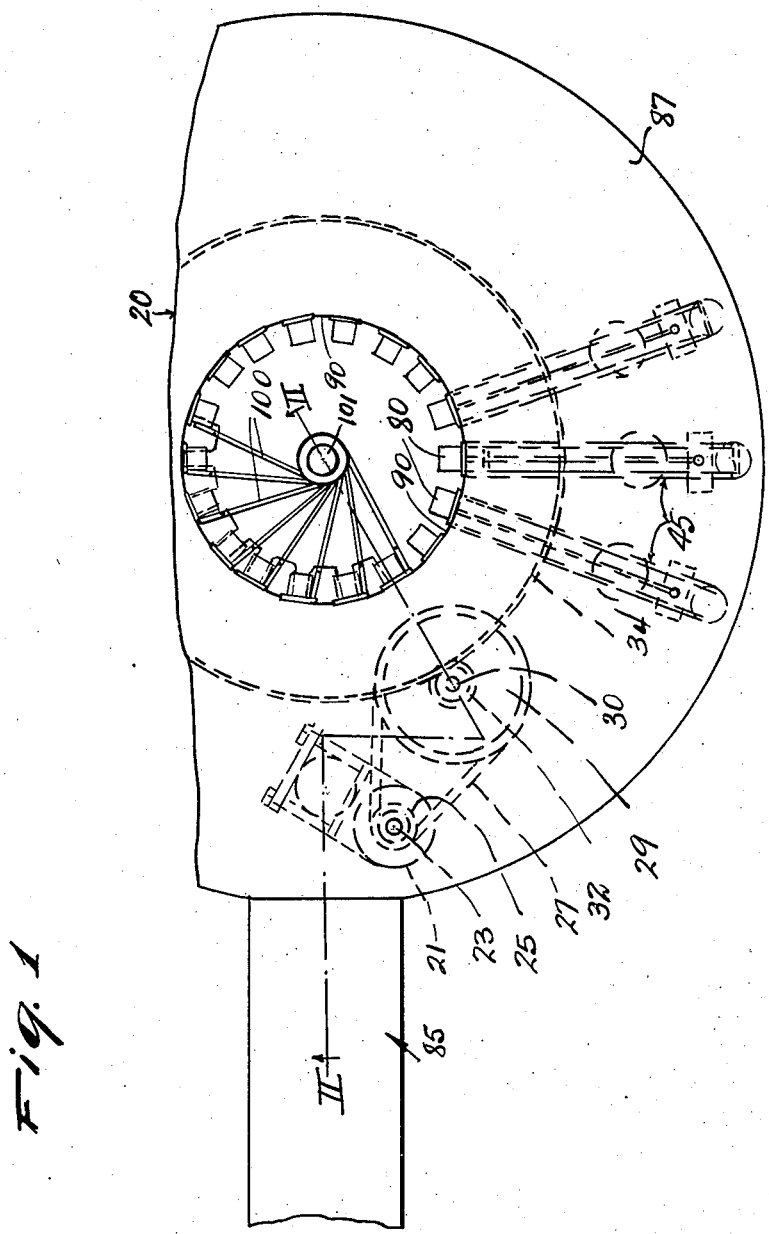

Jan. 30, 1945.   W. OWEN   2,368,321
WEIGHING AND SORTING APPARATUS
Filed Aug. 8, 1942   6 Sheets-Sheet 1

Inventor
WILLIAM OWEN
By Olen E. Bee
Attorney

Jan. 30, 1945. W. OWEN 2,368,321
WEIGHING AND SORTING APPARATUS
Filed Aug. 8, 1942 6 Sheets-Sheet 3
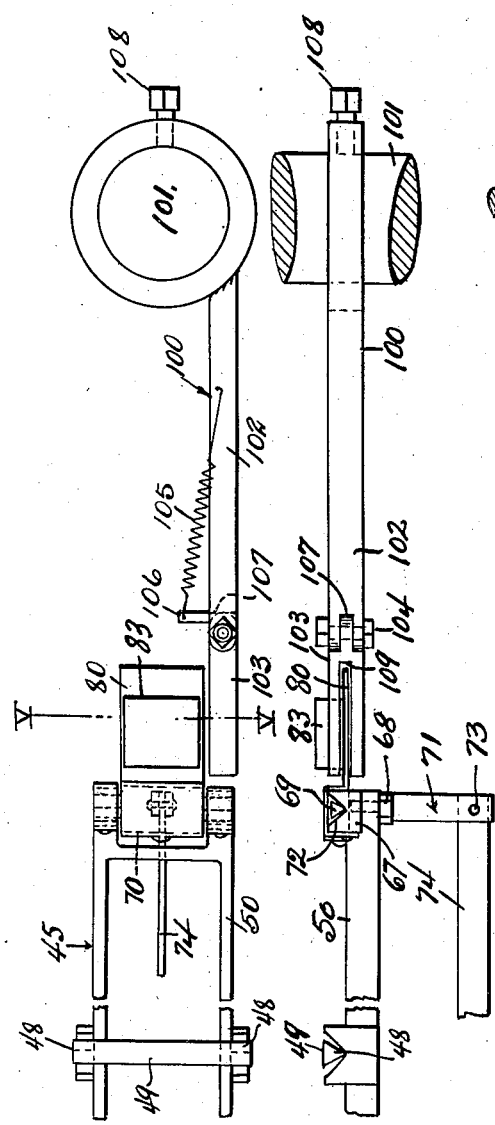
Fig. 3  Fig. 4  Fig. 6  Fig. 7  Fig. 5
Inventor
WILLIAM OWEN
By 
Attorney

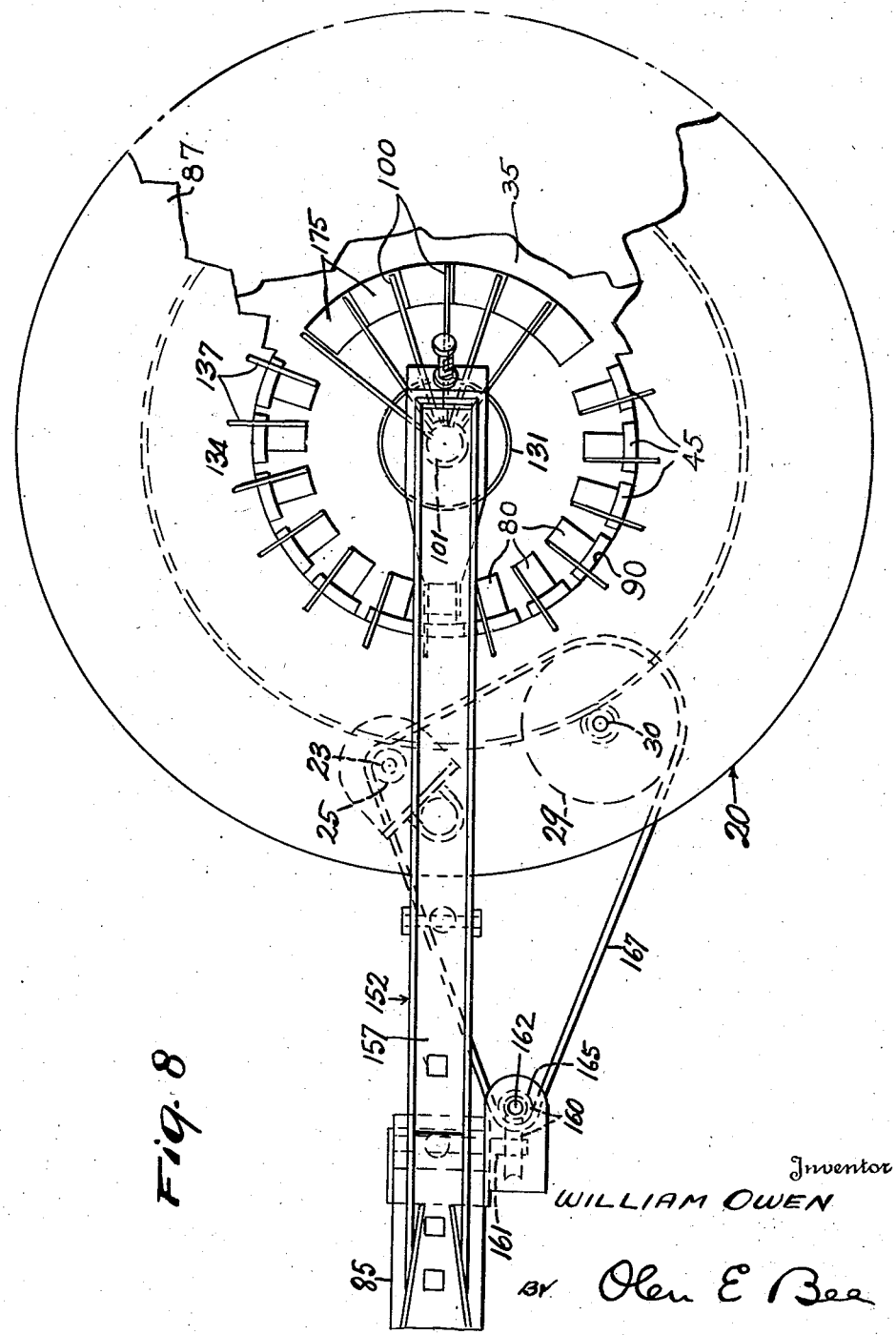

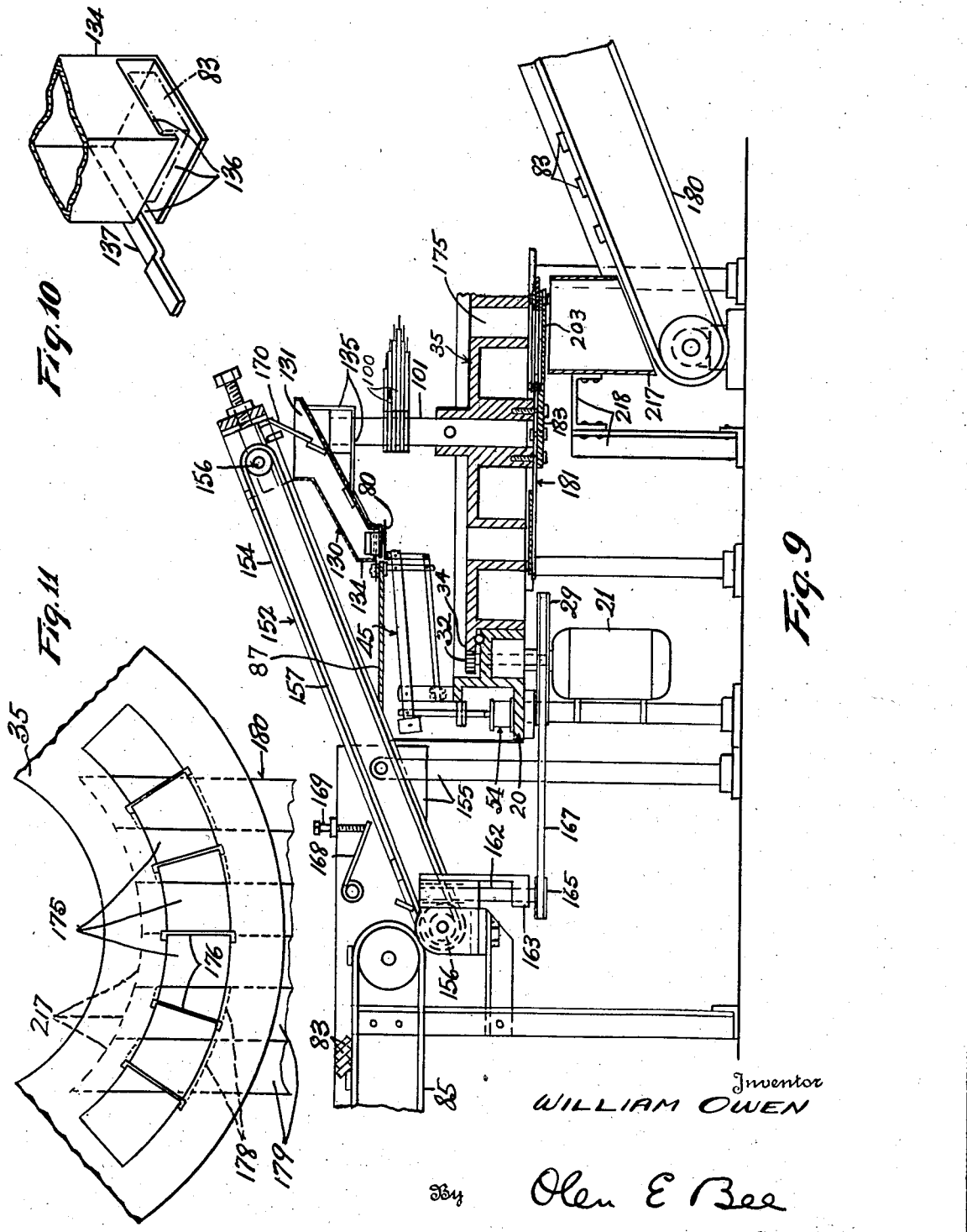

Jan. 30, 1945.  W. OWEN  2,368,321
WEIGHING AND SORTING APPARATUS
Filed Aug. 8, 1942  6 Sheets-Sheet 6
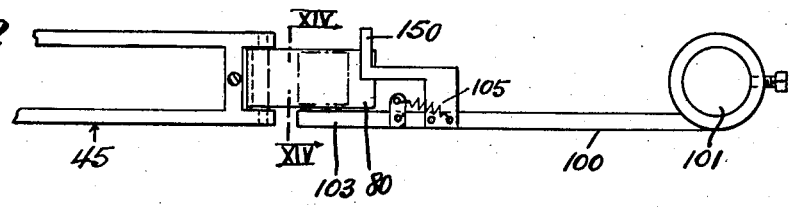
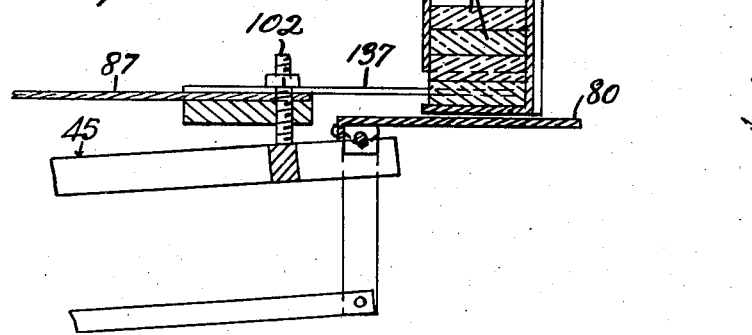
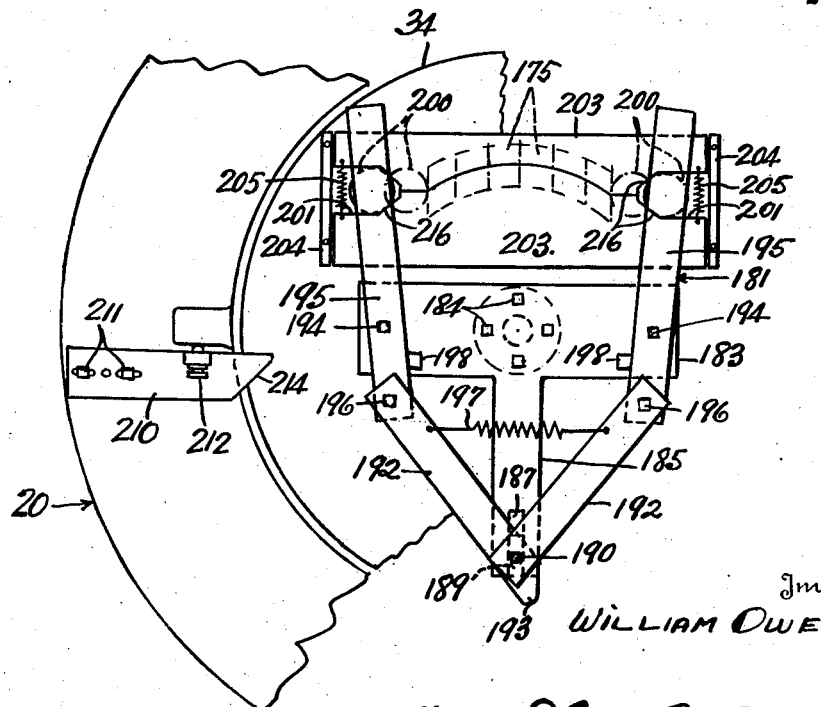
Inventor
WILLIAM OWEN
By Olen E. Bee
Attorney Patented Jan. 30, 1945

2,368,321

UNITED STATES PATENT OFFICE 2,368,321

WEIGHING AND SORTING APPARATUS

William Owen, Pittsburgh, Pa., assignor to Pittsburgh Plate Glass Company, Allegheny County, Pa., a corporation of Pennsylvania Application August 8, 1942, Serial No. 454,171

7 Claims. (Cl. 209—121)

This invention relates to the sorting of articles according to weight and it has particular relation to an apparatus designed to differentiate between weights of relatively small articles and to sort them accordingly.

One object of the invention is to provide an improved arrangement of scale units and mechanism operable in connection therewith.

Another object of the invention is to provide an improved apparatus for weighing articles and automatically classifying them in groups according to weight.

Another object of the invention is to provide an improved automatic weighing and sorting machine.

In one form of structure in which the invention described herein has been incorporated, a series of weighing scale units are arranged radially about a central revolving platform that has a plurality of arms designed to pass the location of an article-receiving pan or tray of each scale unit. The arms are disposed at different levels and the trays when supporting articles of different weights are depressed to different levels. Accordingly a pan depressed to a given level by the weight of an article thereon will be in such position as to have its article pushed therefrom by an arm which has been set to push off an article of a given weight. Containers are placed beneath each arm on the rotatable structure to receive the articles pushed from the scale pans by the arms. Each arm in successive revolutions about a central axis may push articles from any of the scale pans, but only if the weight on any particular scale pan is such as to position the latter so as to be brought to the level of the arm. In this manner, a great number of articles can be weighed and sorted by feeding the articles to the scale pans as fast as they are pushed therefrom. This arrangement is well adapted to weigh and sort optical glass blanks which are relatively light in weight and must be sorted within very narrow limits of weight differences. However, it is apparent that the apparatus is applicable for weighing and sorting various types of articles.

Figure 2:
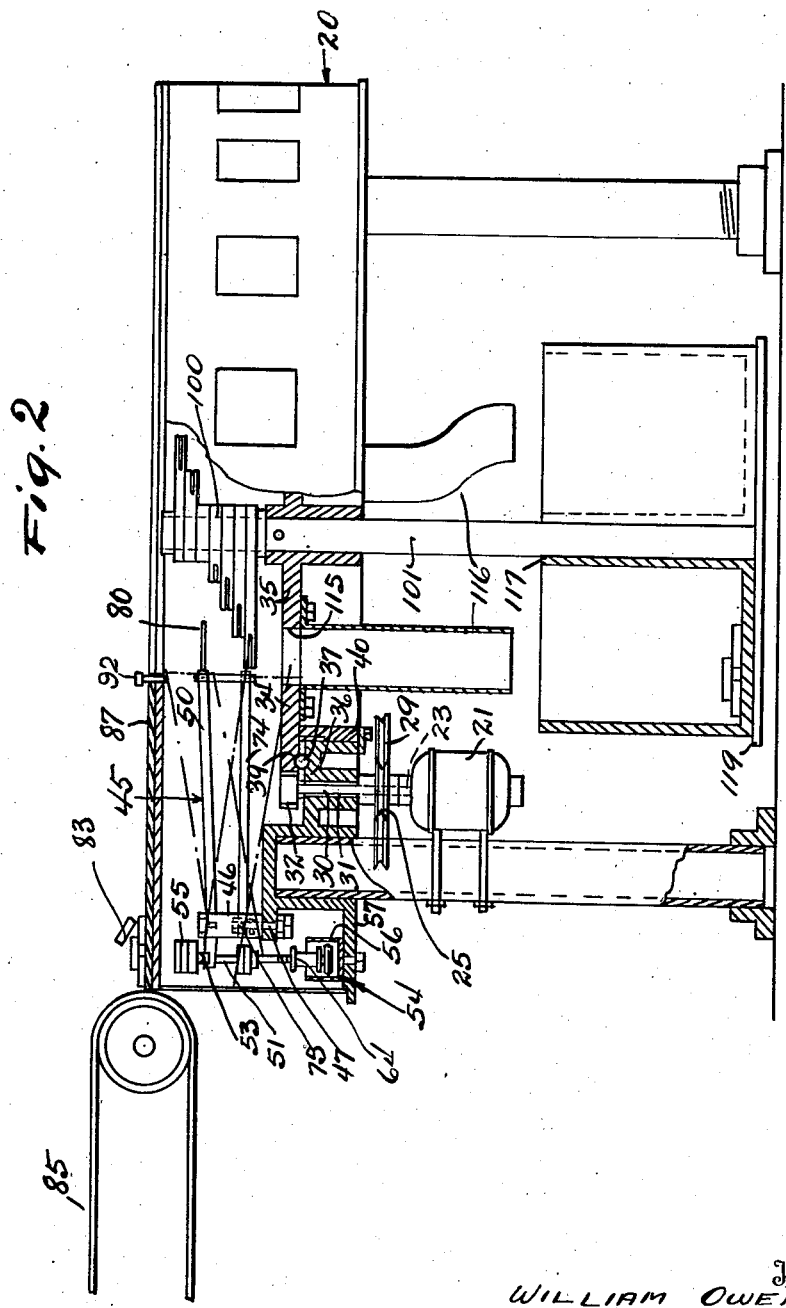

In the drawings:

Fig. 1 is a fragmentary plan of an apparatus designed according to the invention; Fig. 2 is a vertical section taken substantially along the broken line II—II of Fig. 1; Fig. 3 is a fragmentary plan of one of the scale units and cooperating mechanism; Fig. 4 is a fragmentary side elevation of the structure shown in Fig. 3; Fig. 5 is a cross section taken substantially along the line V—V of Fig. 3; Fig. 6 is a fragmentary vertical section of a dash pot included in the scale structure; Fig. 7 is a horizontal section taken substantially along the line VII—VII of Fig. 6; Fig. 8 is a diagrammatic fragmentary plan of another form of apparatus including an automatic feeder for the scales; Fig. 9 is a fragmentary vertical section of the apparatus shown in Fig. 8, the section being taken approximately centrally of the apparatus with portions of the top cover plate and the outer right hand portions of the supporting frame being omitted; Fig. 10 is a fragmentary perspective, on a larger scale, of a magazine feeder; Fig. 11 is a diagrammatic fragmentary plan of a structure through which articles are to be discharged; Fig. 12 is a plan of a scale beam construction and discharger; Fig. 13 is a fragmentary vertical section showing in detail relative positions of a scale tray and feeder; Fig. 14 is a cross section taken substantially along the line XIV—XIV of Fig. 12; and Fig. 15 is a fragmentary bottom plan of automatic discharging mechanism.

In practicing the invention, a supporting frame 20 rigidly carries an electric motor 21 which has its drive shaft 23 extending vertically to support rigidly thereon a peripherally grooved transmission wheel 25 arranged substantially in a horizontal plane. A belt 27, such as a so-called V-belt, is trained about the wheel 25 and about a larger peripherally grooved wheel 29 that is rigidly mounted upon the lower end of a vertical shaft 30. A conventional bearing 31 formed in the frame 20 rotatably carries the shaft, and a pinion 32 rigidly mounted upon the upper end of the shaft 30 meshes with a larger gear 34 formed upon the outer circular edge of a rotatable platform 35.

The outer marginal portion of the platform 35 overlaps an inwardly projecting bearing ledge 36 of the frame, and roller bearing elements 37 seated in grooved portions 39 of the ledge and platform facilitate the rotation of the latter about a vertical axis. A centering flange 40 extending downwardly and integrally from the platform is fitted into an annulus defined by the inner edge of the ledge 36.

A series of weighing scale units 45 are mounted upon pairs of upright stanchions 46 rigidly secured, as indicated at 47, upon the apparatus frame 20 and each scale unit is provided with horizontal knife edge trunnions 48 formed on opposite ends of a cross bar 49. The trunnions rest upon the upper end portions of the stanchions which are recessed to receive them. Each scale unit has a balancing beam 50 which can be in the form of a horizontal frame across intermediate portions of which the bar 49 is directly secured. An upright rod 51 having a knife edge 53 supports its upper end upon the outer end of the beam 50 and also supports beam balance elements 55. The lower end of the rod is provided with an adjustable dash pot 54 which includes a cylinder 56 filled with suitable fluid and secured upon a flange 57 of the machine frame. A piston 59 rigidly secured upon the lower end of the rod 51 fits into the cylinder 56 and is provided with openings 60 extending vertically therethrough. A disc 61 is formed integrally with an upwardly extending sleeve 63 which fits about the rod 51 and the upper end of the sleeve is screw threaded upon the rod, as indicated at 64. In response to rotation of the sleeve 63 the disc 61 is moved toward or away from the upper surface of the piston head 59 to regulate the amount of fluid that can pass through the openings 60 in response to the movement of the piston in the cylinder. Notched balance weights 65 selected according to the weight to be determined can be removably placed upon the rod 51 and rest upon a collar 66 mounted thereon.

The beam 50 projects inwardly of the apparatus and its inner end has mounted thereon a pair of knife edge supporting blocks 67 which are secured on the beam by means of fasteners 68. Horizontal knife edge trunnions 69 formed upon an upper cross bar 70 of a floating frame 71 rest in upwardly opening notches 72 in the blocks 67. This frame is suspended by the trunnions and its lower portion has a pivotal connection 73 securing it to one end of a steadying bar 74 which is disposed parallel to the beam 50. The bar 74 has a pivotal connection 75 at its outer end securing it to the frame 20 in connection with the mounting of the upright stanchions 46. The pivotal axes of the knife edge trunnions 48, 69 and the pivotal connections 75, 73 define a parallelogram and hence the floating end frame 71 remains in a vertical position regardless of the pivoting action of the beam 50. A horizontal pan or plate 80 fixed rigidly upon the upper portion of the frame 71 remains in a horizontal position regardless of the pivotal action of the beam 50.

Articles 83 to be weighed and classified according to weight can be conveyed by means of a conventional belt conveyor 85 to a position upon a horizontal top 87 prepared for that purpose on the frame 20. An opening 90 in the apparatus frame 87 is so positioned as to expose the horizontal pans 80 of the several scale units and an article 83 can be dropped through the opening 90 upon the pans immediately beneath it. In response to the weight of the article 83 each beam 50 assumes a position according to the weight of the article. If the articles placed upon all of the pans happen to weigh the same, all of the pans will assume a horizontal position at a given level. A plurality of horizontal arms 100 are arranged radially at different levels upon a central vertical shaft 101 which is axially supported upon the platform 35, that is, it is axially arranged with respect to the path of rotation defined by the bearings 37.

Normally in its unloaded position the scale beam 50 assumes an upper position adjacent the apparatus top 87 and the position of the horizontal pan 80 of each scale unit can be gauged by a set screw 92 threaded in the top 87 at such position as to limit upward movement of the beam.

For purposes of illustration, it may be assumed that the difference in level from one arm 100 to an adjacent arm corresponds to the difference in position of the pans as a result of the articles placed on the respective pans differing in weight by one weight unit, for example, one gram. This weight unit can be selected as desired and the scales calibrated accordingly.

Each radially extending arm 100 is provided with a body portion 102 and a horizontal pivotal section 103 which is connected to the body of the arm by means of a vertical pivot pin 104. A tension spring 105 has one of its ends connected to the outer end of a finger 106 extending rigidly from the inner end of the section 103 and the other end of the spring is connected to the body of the arm 100. This spring normally presses the base portion of the finger 106 against an abutment 107 of the arm and thereby maintains the sections of the arm in alinement. In case the section 103 strikes an obstruction, it will be pivoted rearwardly with respect to rotation of the platform 35 and shaft 101 which rotation is indicated as being in a clockwise direction (Figs. 1 and 3). The shaft 101 is disposed through the base portion of each arm 100 and the latter can be adjusted vertically and radially or angularly. A set screw 108 threaded through the arm against the shaft facilitates this adjustment.

The section 103 has a slot 109 extending lengthwise thereof from a location adjacent its pivotal connection 104 and outwardly through its end. The walls of the slot converge rearwardly from forward sharp edges 110 (Fig. 5) defined thereby and terminate in a relatively narrow passage 112 which is sufficiently wide to receive each scale tray therethrough.

In the rotation of the platform 35, the several arms 100 revolve therewith and the articles placed upon the pans 80 of the scales are pushed therefrom. For example, an article weighing 22 grams will depress the scale pan upon which it is placed to such a position or level that an arm 100 placed in position to push a 22 gram article therefrom will do so. If the pan does not register precisely with the passage 112, the converging walls leading thereto will guide the pan properly.

An opening 115 in the rotatable platform 35 is formed immediately below each section 103 and passes beneath each pan 80. A chute 116 secured to the lower side of the platform communicates with each opening 115 and receives articles pushed from the scale pans. Removable containers 117 corresponding in number to the number of arms 100 are placed upon a shelf 119 that is rigidly secured to the lower end portion of the vertical shaft 101 and rotates therewith. The containers can be marked according to the weight of articles to be received therein. In order to utilize the space surrounding the vertical shaft, the containers can be constructed in the form of segments and placed radially about the shaft 101. In this arrangement the chutes can be shaped to extend to their proper position for feeding the weighed and sorted articles into the several containers.

An operator can feed articles to the pans 80 through the opening or recessed portion 90 in the top of the frame member or an automatic feeder 130 can be designed according to the structure shown in Figs. 8 to 14. The automatic feeder includes a hopper 131 from which a magazine 134 extends for receiving a series of the articles 83 in stacked relation. Suitable brackets 135 are provided for rigidly securing the hopper and magazine upon the upper portion of the shaft 101. The lower end of the magazine, which is rectangular in cross-section is cut away along three sides, as indicated at 136 and a finger 137 mounted rigidly upon the stationary top 87 of the frame 20 is adapted to pass through the notched portion of the magazine at such position of the rotating structure as to push one of the articles from the magazine and deposit it upon the scale pan 80 disposed immediately therebeneath. It is to be understood that the inner end portions of the scales, including the pans 80, project inwardly beyond the top plate edge defined by the recessed portion 90.

With respect to the direction of rotation of the shaft 101 and arms 100 rotatable therewith, the magazine 134 is placed immediately behind the group of arms 100. That is, the group of arms 100 pass a given point in their rotation immediately prior to the passing thereby of the magazine. One of the fingers 137 is mounted adjacent each pan 80 and one article is thus deposited on each pan during one revolution of the platform 35. Likewise, articles 83 will be pushed from all of the pans 80 prior to the next operation of depositing articles thereon.

In certain instances the weight of the article may be so little that the scale pan 80 will not be depressed sufficiently to permit the article to be pushed therefrom by the upper arm 100. In order to avoid any difficulty of operation in this respect, the upper arm 100 (Figs. 12 and 14) is provided with an inclined guide finger 150 placed in advance of the pivotal push-off section 103. This finger engages the pan at its end portion and depresses it as shown in Fig. 14 so that its path of movement will be shifted to a position below the stationary finger 137 which otherwise would interfere with the proper sliding of the article from the pan.

In the construction shown in Figs. 8 to 13 and in connection with the horizontal belt conveyor 85, which in this instance is set back from the outer edge of the stationary frame 20, an inclined belt conveyor 152 is mounted between guides 154 that are rigidly carried upon frame structure 155. The guides rotatably support rolls 156 adjacent their opposite ends to receive the belt 157 upon which the articles 83 are transported. Worm gearing 160 connected to a shaft 161 of the lower roll and to an upright intermediate shaft 162 serves as transmission mechanism for driving the conveyor 152. The shaft 162 is rotatably mounted upon a bracket 163 that is rigidly carried upon the frame structure 155. A pulley 165 rigidly secured upon the lower end of the latter shaft receives a drive belt 167 which corresponds to the belt 32, but is longer in order to be trained about the pulley 165 as well as about the pulleys 23 and 29.

The lower end of the conveyor 152 is disposed immediately below the discharging end of the conveyor 85 and receives articles, such as optical glass blanks 83 therefrom. These articles are carried up the conveyor 152 and deposited in the hopper 131. A plate 168 mounted in the frame 155 immediately above the conveyor can be adjusted by a set screw 169 to prevent the articles from being piled one upon another as they are transported up the conveyor. Also an inclined plate 170 carried upon the guides 154 adjacent the hopper 131 directs the articles 83 properly into the magazine 134 to be fed from the latter to the scale pans in the manner specified above.

Referring to Figs. 8 to 15, I have shown automatic sorting and collecting mechanisms for the purpose of handling the articles after they have been weighed. A series of compartments 175 defining an arcuate configuration about the shaft 101 as a center and diagrammatically shown in Fig. 8 are spaced according to the spacing of the arms 100 and are arranged in such relation that the articles pushed from any of the scales by a particular arm 100 will always fall into the same compartment. That is, each arm has a particular compartment into which it deposits articles of a given weight. It is to be understood that the arms 100, the compartments 175, and the platform 35 all rotate as a unit and hence remain in the same relative positions regardless of the operation of the apparatus. Therefore the vertical distance of the arms 100 from the respective compartments is not of material importance so long as the article 80 discharged from a scale pan by any of the arms will fall into its proper compartment. Partitions 176 (Fig. 11) are mounted in the rotatable platform 35 in grooves 178 formed therein and are so shaped that the bottoms of the compartments are alignable with sections 179 of a conveyor 180 at a predetermined position in the rotation of the platform 35. In looking down upon this structure, as indicated in Fig. 11, it will be noted that the partitions 176 separating the compartments have their upper edges spaced considerably more than their lower edges. The upper edges of these partitions are readily disposed with respect to the center of rotation of the platform 35 while their lower edges extend parallel to one another and parallel to the length of the conveyor 180. The grooves 178 indicate this arrangement, and the lower extremities of these compartments so indicated are shown in broken lines in Fig. 15.

An article collecting and discharging mechanism 181 includes a T-shaped plate 183 rigidly mounted upon the lower side of the rotatable platform by means of conventional fastening elements 184. This mechanism is omitted from the showing in Fig. 11. An arm 185 of the plate has a slot 187 formed at the outer end thereof to receive a slidable block 189 that is pivotally connected by means of a bolt 190 to end portions of horizontal links 192. One of these links extends outwardly beyond the bolt and is in the form of an extended cam 193.

Opposite end portions of the head of the T-plate 183 are provided with bolts 194 anchored thereien upon which levers 195 are pivotally mounted intermediate their ends for pivoting horizontally. The inner ends of these levers are pivotally connected to the ends of the links 192 by means of bolts 196. A tension spring 197 connected to the links 192 adjacent the bolts 196 exerts force tending to draw the links toward each other and it maintains the levers abutted against stops 198 rigidly mounted upon the plate 183. End portions of the levers 195 opposite the bolts 196 are provided with circular cams 200 rigidly secured upon the upper sides thereof and such cams fit between recessed portions 201 of a pair of shutter plates 203 arranged in abutting or adjacent, edge-to-edge relation. Stop strips 204 secured to the platform adjacent opposite ends of the shutter plates prevent them from being displaced longitudinally, while tension springs 205 connected to the shutter plates adjacent their ends normally maintain them in closely against the cams 200 in opposed edge-to-edge relation. The intermediate opposed edges of these plates are curved to follow an arc corresponding to the arc of curvature of the series of compartments 175. These shutter plates fit closely adjacent the lower edges of the compartments 175 and in effect serve as bottom structure therefor to hold temporarily the articles 83 which have been deposited in the compartments.

A bracket 210 mounted rigidly by means of adjustable fasteners 211 and 212 upon the lower side of the frame 20 in which the platform is rotatable is provided with a cam surface 214 which is disposed in the path of rotation of the cam 193. When the latter cam strikes the cam surface 214, the circular cams 200 of the levers 195 are actuated inwardly against inclined edges 216 of the shutter plates 203 to spread the latter so that the articles in the compartments 175 are dropped therefrom. A series of chutes 217 registering respectively with the several sections 179 of the conveyor 180 are mounted upon stationary frame supports 218. When the shutters spread or separate to drop the articles, these chutes at the same instant are disposed immediately below the series of revolving compartments 175. Therefore, as the cam 214 actuates the shutter plates 203, during each revolution of the platform 35, the articles that have been sorted and collected in the compartments 175 are discharged at the proper moment through the chutes 217 upon the respective sections of the conveyor 180 and according to their weight classification. The articles 83 are thus pushed from the scale pans 80 into the compartments 175 where they are temporarily retained upon the shutter plates 203 which then open at the proper moment to discharge said articles through the chutes 217 upon the designated areas 179 of the conveyor.

From the foregoing description it will be apparent that the several radially arranged units or scales 45 are adapted to receive the articles which are sorted according to various weights thereof, and within narrow limits of weight differentials. It should be noted that the group of arms 100 are contained within an angle of less than 180 degrees about the axis of the shaft 101 and that the remaining space about the shaft is sufficient to permit the placing of the articles upon the scale pans manually, as required with reference to the operation of the apparatus shown in Figs. 1 and 2, between successive revolutions of the rotatable structure. Likewise, the article-feeding magazine 134 revolves with the group of arms 100 immediately behind the latter, and, hence, each article is fed to a scale pan only at a time immediately after the group of arms has passed a given point on the stationary frame. Also, the rotation of the platform structure is so timed that after the articles have been placed upon the scale pans, there is sufficient time for each pan to settle to such position as to register the article weight correctly before such article is deposited in one of the compartments 175, and thence through one of the chutes 217 to the area 179 of the conveyor which is to receive it.

Although illustrative forms of the invention have been shown and described in detail, it will be apparent to those skilled in the art that the invention is not so limited, but that various changes can be made therein without departing from the spirit of the invention or from the scope of the appended claims.

I claim:

1. In an apparatus for sorting articles according to their weight, a driven rotatable structure, a stationary frame supporting said structure about a vertical axis of rotation, an article-containing magazine mounted upon said structure to rotate therewith, a member on said frame past which said magazine rotates to engage articles in the magazine and drop them therefrom during successive revolutions of the magazine, a weighing scale mounted on said frame and including a scale pan disposed below said member to catch articles dropped from the magazine, sectional arms rotatable with said structure at different levels assumed by the scale pan under varying weights of articles to push said articles from the pan, the outer section portions of the arms being yieldable backwardly from the direction of rotation, and means to receive separately according to approximate weight the articles pushed from the pan by each arm.

2. In an apparatus for sorting articles according to their weight, a driven rotatable structure, a stationary frame supporting said structure about a vertical axis of rotation, an article-containing magazine mounted upon said structure to rotate therewith, radially spaced members on said frame past which said magazine rotates to engage articles in the magazine and drop them therefrom during successive revolutions of the magazine, radially spaced weighing scales mounted on said frame and including a scale pan disposed below and adjacent the respective spaced members to catch articles dropped from the magazine, sectional arms rotatable with said structure at different levels assumed by the scale pans under varying weights of articles to push said articles from the pans, said arms having inclined guiding surfaces to guide the scale pans within appreciable variations in levels at approximately the position at which the article of substantially given weight is to be pushed from said pans.

3. In an apparatus for sorting articles according to their weight, a driven rotatable structure, a stationary frame supporting said structure about a vertical axis of rotation, an article containing magazine mounted upon said structure to rotate therewith, a series of members disposed radially on the frame adjacent the rotatable structure and past which said magazine rotates to engage articles in the magazine and drop them therefrom during successive revolutions of the magazine, a series of weighing scales mounted on said frame each including a scale pan disposed below said members to catch articles dropped from the magazine, arms arranged radially on said structure at different levels according to the levels assumed by the scale pans under varying weights of articles to push said articles from the pans, sorting compartments rotatable with said structure and arranged radially thereon below the respective arms to receive articles pushed off the pans by said arms, and means for releasing articles from the bottom of the compartments at a predetermined position in the path of rotation of said structure.

4. In an apparatus for sorting articles according to their weight, a driven rotatable structure, a stationary frame supporting said structure about a vertical axis of rotation, an article-containing magazine mounted upon said structure to rotate therewith, a series of members disposed radially on the frame adjacent the rotatable structure and past which said magazine rotates to engage articles in the magazine and drop them therefrom during successive revolutions of the magazine, a series of weighing scales mounted on said frame each including a scale pan disposed below said members to catch articles dropped from the magazine, arms arranged radially on said structure at different levels according to levels assumed by the scale pans under varying weights of articles to push said articles from the pans, sorting compartments rotatable with said structure and arranged radially thereon below the respective arms to receive articles pushed off the pans by said arms, shutters constituting bottoms of the compartments, and coacting means on the structure and compartments for opening and closing the latter in response to rotation of said structure.

5. In an apparatus for sorting articles according to their weight, a driven rotatable structure, a stationary frame supporting said structure about a vertical axis of rotation, an article-containing magazine mounted upon said structure to rotate therewith, a series of members disposed radially on the frame adjacent the rotatable structure and past which said magazine rotates to engage articles in the magazine and drop them therefrom during successive revolutions of the magazine, a series of weighing scales mounted on said frame each including a scale pan disposed below said members to catch articles dropped from the magazine, arms arranged radially on said structure at different levels according to levels assumed by the scale pans under varying weights of articles to push said articles from the pans, sorting compartments rotatable with said structure and arranged radially thereon below the respective arms to receive articles pushed off the pans by said arms, shutters secured slidably against the lower sides of said compartments to open and close the bottoms thereof, an actuating mechanism rotatable with said structure and engaging at least one of said shutters, and a stationary element in the path of rotation of said mechanism and responsive to rotation thereof to actuate the shutters in their opening and closing action.

6. In an apparatus for sorting articles according to their weight, a driven rotatable structure, a stationary frame supporting said structure about a vertical axis of rotation, a series of weighing scales arranged radially about the rotatable structure and mounted on the stationary frame, said scales having articles receiving pans extending over the rotatable structure, an article-containing magazine mounted on said structure to rotate therewith, a series of members on the frame adjacent the respective scales for successively discharging articles from the magazine to the scale pans as the magazine passes said members, a series of compartments arranged radially in the rotatable structure, elements mounted radially on said structure above the compartments at different levels according to levels assumed by said scale pans under varying weights of articles to push the latter from the pans into the compartments, a conveyor past which the structure rotates, and discharge mechanism associated with the compartments and stationary frame and responsive to rotation of said structure to discharge the articles in classified groups on the conveyor as the compartments pass said conveyor.

7. In an apparatus for sorting articles according to their weight, a driven rotatable structure, a stationary frame supporting said structure about a vertical axis of rotation, a series of weighing scales mounted on said frame and spaced radially around the axis of rotation of said structure, each scale having an article receiving pan movable to different levels according to weights of articles placed thereon to be weighed, said supporting frame having an upper centrally recessed portion above the rotatable structure and through which articles to be weighed can be fed to the scale pans, arms arranged radially on said structure at different levels according to the levels assumed by the scale pans under varying weights of articles to push said articles from the pans, sorting compartments rotatable with said structure and arranged below the respective arms to receive articles pushed off the pans by said arms, and means for releasing articles from the bottom of the compartments at a predetermined position in the path of rotation of said structure.

WILLIAM OWEN.